Sept. 3, 1968          A. LITCHARD          3,399,507

AUTOMATIC PACKAGING MACHINE

Filed Jan. 5, 1966          13 Sheets-Sheet 3

United States Patent Office 3,399,507
Patented Sept. 3, 1968

3,399,507
AUTOMATIC PACKAGING MACHINE
Alexander Litchard, 322 N. Main St.,
Wellsville, N.Y. 14895
Filed Jan. 5, 1966, Ser. No. 518,855
18 Claims. (Cl. 53—59)

This invention relates to machines for packaging produce, such as potatoes, onions, citrus fruits and the like, or articles of comparable size, into bags such as are commonly used for holding such products.

It is an object of this invention to produce a machine of this type with means of improved construction for opening the bag and holding it in open position while the produce is discharged into the same.

It is also an object of this invention is to provide improved mechanisms for feeding the bags into the position in which they are opened, and also to graps the bag at its upper edge and to open the bag while thus grasped; also to introduce fingers into the open bag and move them outwardly to hold the bag in wide open position to receive the produce.

It is also an object to mount the bag-opening and supporting mechanism on a turntable which advances the bag and the means for holding it open to a bag-filling position, including a scale which interrupts the feeding of produce to the bag when the same has attained the desired weight.

It is also an object to provide a bag-feeding mechanism of improved construction including a magazine in which the bags are fed into position to be opened both by gravity and by bag-advancing mechanism; also to provide a bag feeding mechanism of improved construction which may be supplied with the bags without stopping the machine.

The machine embodying my invention is mounted on a base 30 which has a plurality of upwardly extending columns 31 which support the various parts of the machine from the base.

My improved machine as shown in the drawings operates on bags of the general type commonly employed for containing potatoes, onions, oranges and produce and articles of similar size. These bags include front and rear panels and side panels which are folded inwardly toward each other to extend between the two front and rear panels. The bottom of the bag which connects with the four panels is normally folded over against the front or rear panel when the bag is in collapsed condition, so that the bottom of the bag is folded at about the lower edge of one of the front or rear panels and upwards against the opposite panel. The folded part of the lower end of the bag is generally known as the "satchel." Because this type of bag is well known, further description of the same is not deemed necessary.

Figure 4:
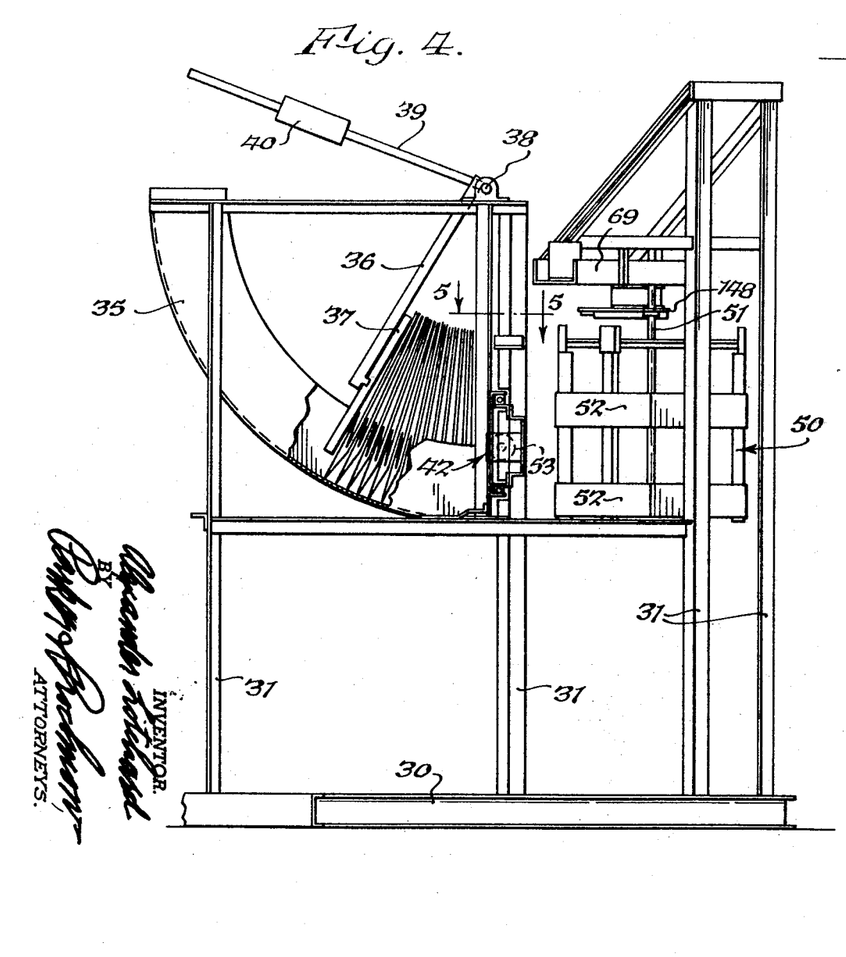
FIG. 4 is an end view thereof on an enlarged scale as seen on line 4—4, FIG. 2.
Figure 5:
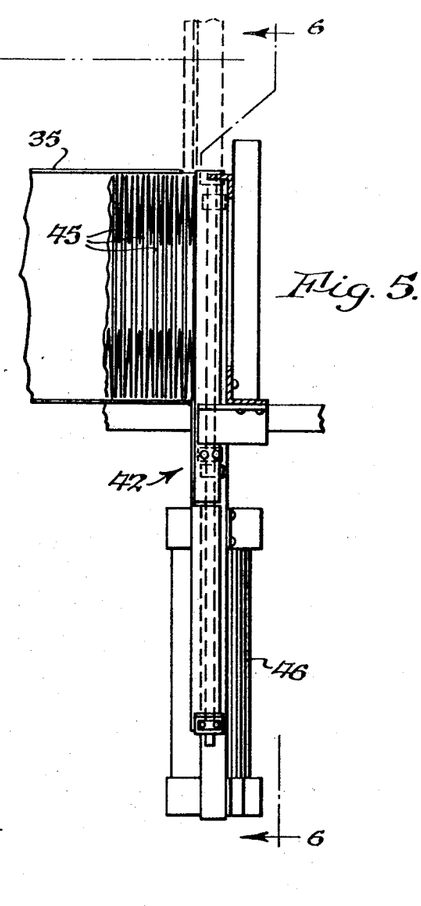
FIG. 5 is a fragmentary plan view thereof on line 5—5, FIG. 4.

In view of the construction of the bags the lower or satchel portions thereof with their bottoms folded upwardly are of course of considerably greater overall thickness than the upper portions thereof, and in order to discharge the bags correctly in upright positions at the discharge end of the magazine, the bag magazine 35 is curved so that the bags when at the upper end of the magazine lie substantially horizontally, and are in upright positions at the discharge end of the magazine as shown in FIG. 4.

When the magazine is filled the weight of the bags will urge the same to the lower discharge end thereof, but as the bags approach the lower part of this magazine and when the magazine is partly empty, gravity will have very little effect in feeding the bags. Consequently I have provided a feeding mechanism by means of a weight device comprising a pressure arm 36 having a bag-contacting member 37. The pressure arm is pivoted at 38 and has a weight arm 39 rigidly connected therewith upon which a weight 40 is adjustably mounted. This construction provides a varying pressure against the bags, depending on how many bags are in the magazine 35. Obviously when the magazine is nearly full the pressure arm 36 will be nearly horizontal, and the weight arm 39 will be in an upright position so that comparatively little pressure will be exerted against the bags, which are then advanced mainly by gravity. However, as the feeding arm 36 is moved downwardly the weight 40 on the arm 39 will move into a position in which it gradually increases the pressure on the arm 36. By this means the bags will be fed to the discharge end of the magazine by a substantially uniform pressure acting on the same in which the weight complements gravity.

Figure 6:
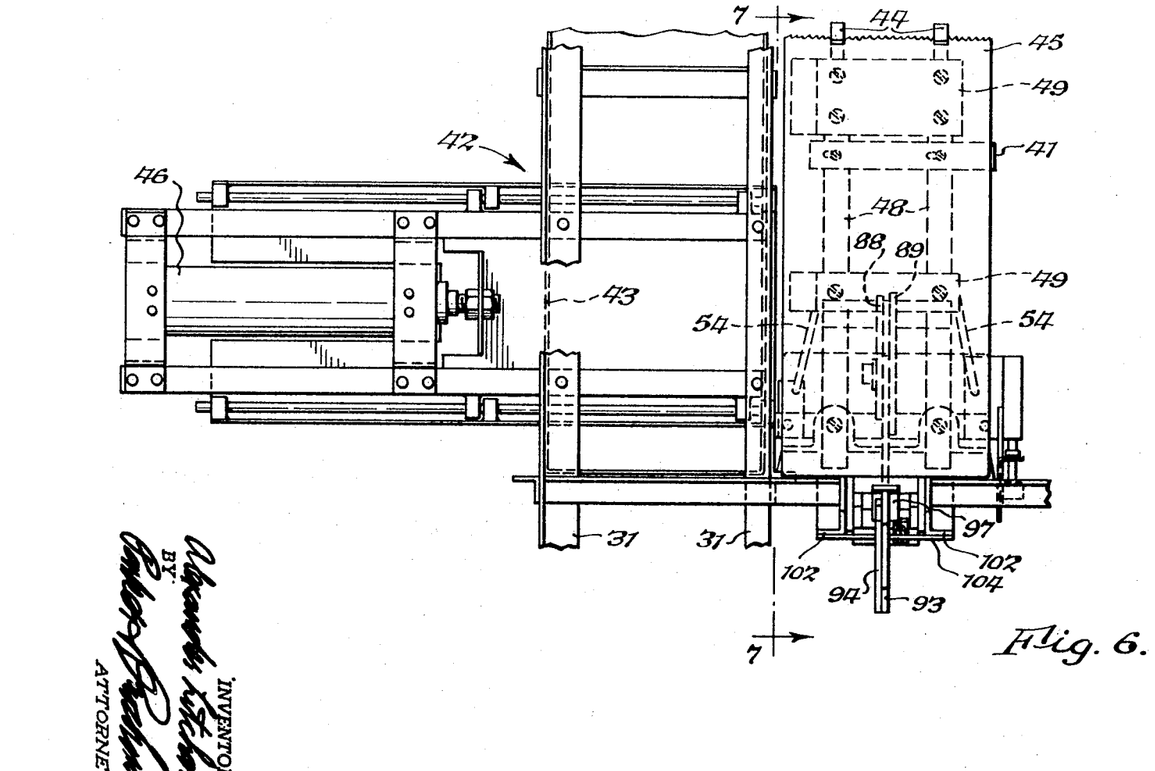
FIG. 6 is a sectional plan view thereof on line 6—6, FIG. 5.
Figure 7:
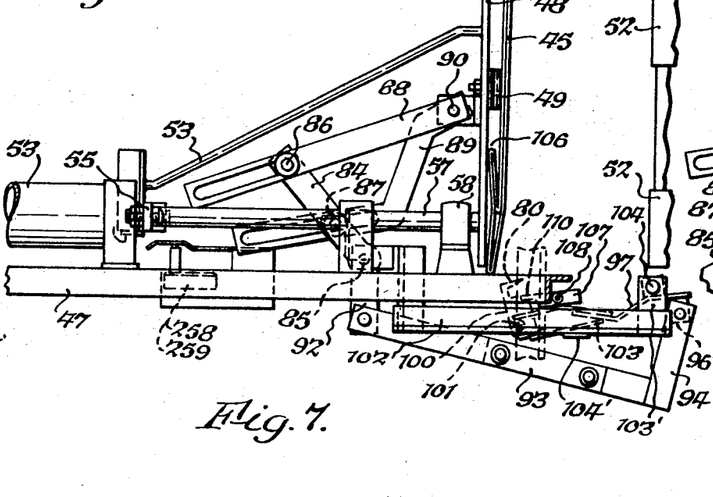
FIG. 7 is a fragmentary, sectional elevation thereof on line 7—7, FIG. 6.

Means of suitable kind are provided for feeding the bag at the discharge end of the magazine outwardly therefrom, and for this purpose a slide 42 is provided which moves in a horizontal direction crosswise of the discharge end of the magazine. In the construction shown by way of example, this slide has an edge or projection 43 which extends into position to engage an edge of the foremost bag 45 in the magazine and slide the same horizontally on its bottom edge past the magazine. This slide may be actuated in any suitable or desired manner, for example, by means of a piston contained in air cylinder 46 suitably connected with the slide to move the same across the discharge end of the magazine and back to its starting position for engaging another bag in the same manner. The edge or projection 43 moves a bag to the right in FIG. 6 into a position in which it is supported on frame members 47, and which its position is determined by a stop 41. The bag 45 is held in upright position by means of top-opening fingers 44 releasably engaging the upper edge of the bag. One face of the bag is also supported by a bag-advancing plate 48 having pads 49 mounted thereon.

From the position shown in FIG. 7, the bag is moved to one of the sections of a turret 50 which is pivotally mounted on the frame of the machine to rotate about an axis 51. This turret has panels 52 against which the bag is placed when transferred to the turret. Any suitable means may be provided for transferring the bag to the turret, for example, an air motor 53 suitably mounted on the frame of the machine and having arms 54 connected with the air motor by means of the cross arm 55. The other ends of the arms 54 are connected with the upright supporting and advancing plate 48. The lower part of the supporting plate 48 is also connected with the air motor by means of a pair of rods 57 guided in bearings 58. Consequently when the air motor pushes the supporting plate 48 to the right in FIG. 7, the supporting and advancing plate and the bag will be moved into a position shown in FIG. 8, in which the bag rests against the supporting panels 52 of the turret.

Figures 11, 12, 13, 14:
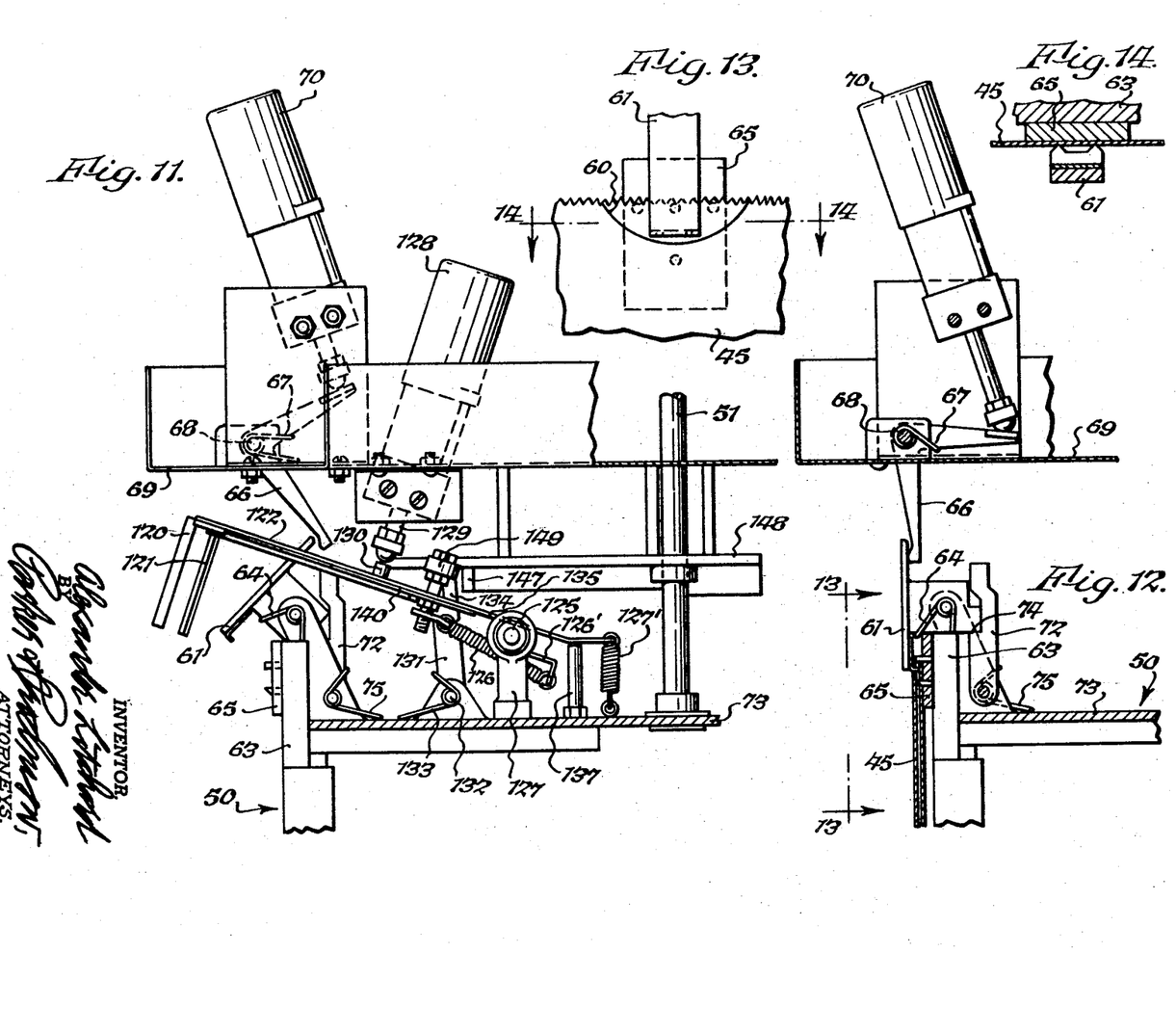
FIG. 11 is a fragmentary, sectional elevation of the mechanism for handling the bags.
FIG. 12 is an elevation, partly in section, showing the means for grasping part of the upper edge of the bag.
FIG. 13 is a fragmentary elevation thereof as seen from line 13—13, FIG. 12.
FIG. 14 is a sectional view thereof on line 14—14, FIG. 13.

The upper end of the bag has a thumb opening 60, FIG. 13, on one of its panels through which the opposite panel may be grasped for holding the bag in an upright position. In this construction shown for this purpose, FIGS. 11 to 14, a thumb latch 61 is provided which is pivoted at 62 on a standard extending upwardly from the turret plate 73. The thumb latch is normally held in an inoperative position by a spring 64 and may be swung about its pivot toward a stationary pad 65, mounted on the part of the turret 50. When a bag is fed to the turret, a panel of the bag located opposite to the thumb opening 60 is adjacent the pad 65. Consequently when the thumb latch 61 is swung about its pivot against the action of the spring 64, it will engage the bag as shown in FIGS. 12 and 13, and thus hold the bag.

The actuation of the thumb latch may be effected in any desired manner, for example, by means of one arm of a bell crank lever 66 pivoted at 68 on a fixed part of the machine, for example, on a horizontal plate 69. One arm of the bell crank lever when swung about its axis engages an upwardly extending part of the thumb latch and the other arm is engaged by the plunger of a motor 70 actuated by motive fluid or electricity in synchronism with the positioning of the bag on the turret. A spring 67 releases the crank lever to return it to its non-engaged position.

When the thumb latch has gripped a bag it is held in gripping position by a holding latch 72 pivoted on a horizontal plate 73 of the turret. The latch has a shoulder 74 arranged to engage a part of the thumb latch when the same is in bag-holding position. A spring 75 holds the holding latch in its holding position until released by a suitable overhead cam when the upper end of the bag is opened. The part on which the bag is supported by means of the thumb latch is mounted on the turret. The thumb latch and the pad 65 may have any desired gripping means for securely holding the bag, such as prongs or projections which may penetrate the paper of the bag to secure the same firmly in holding position.

Figure 8:
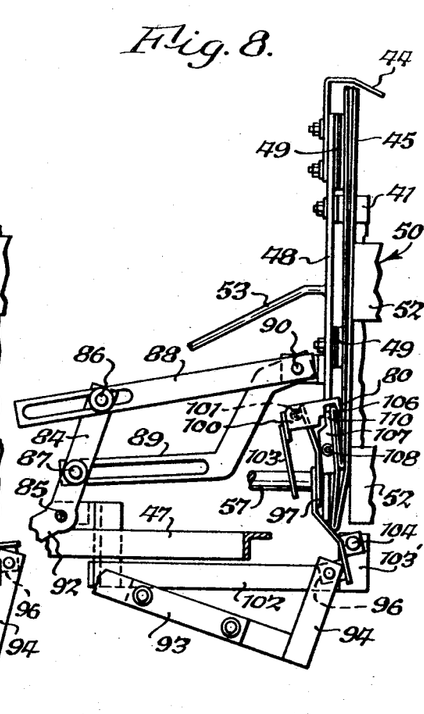
FIG. 8 is a view similar to FIG. 7 but showing the parts of the machine in different positions.
Figure 9:
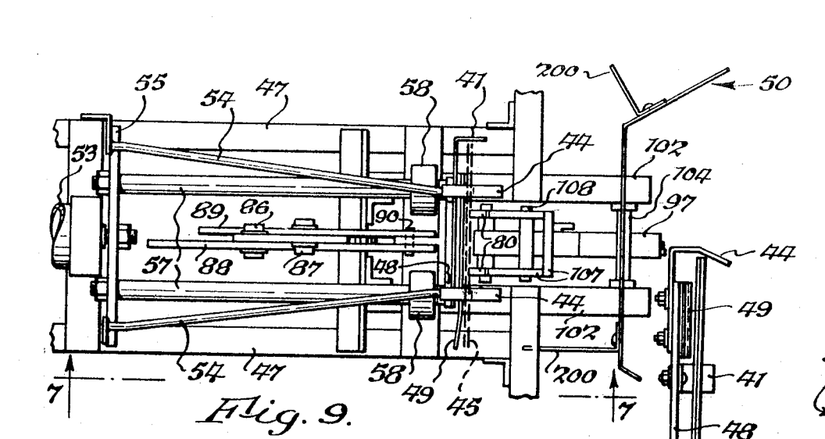
FIG. 9 is a fragmentary plan view of the mechanism shown in elevation in FIG. 7.

When the bag is supported on a station of the turret by means of the thumb latch, it is opened to receive the produce, and this opening mechanism includes a hook 80, FIGS. 7 and 8, mounted to engage an edge of the folded-up, lower end or satchel of the bag while the bag is suspended by the thumb latch 61 holding the upper edge of one panel of the bag. The actuation of the hook 80 may be effected in any suitable manner to move it from its lowest and inoperative position shown in FIG. 7 to its upper, operative position shown in FIG. 8. For this purpose I provide a bell crank 84 which is pivoted at 85 on a stationary part of the machine. This bell crank has an arm with pivots 86 and 87 extending into slots of arms 88 and 89. These slotted arms are connected to a common pivot 90 on the rear face of the bag-supporting plate 48 which, during its movement from the position shown in FIG. 7 to that shown in FIG. 8, imparts motion to the two links 88 and 89 which in turn imparts motion to the bell crank 84, because of the moving of the pin 87 of the bell crank to the opposite end of the slot in the link 89.

The bell crank has a downwardly extending arm 92 to the end of which is pivoted an angle-shaped link 93 which has at the other end thereof an upwardly extending part 94. The hook 80 which pulls the upwardly folded bottom of the bag downwardly is mounted on a support 97 which has a lug or arm 96 extending outwardly therefrom in one direction and pivoted on the upper end of the part 94 of the angle-shaped link 93. The support 97 also has another arm or lug secured thereto and extending outwardly therefrom in the opposite direction and pivoted at 104 on an upwardly extending finger 103' of a stationary part 102 secured on the frame of the machine. It will be noted by comparing FIGS. 7 and 8 that as the angle-shaped link 93 is moved to the left by means of the crank arm 92, has support 97 will be swung about the pivot 104 from the position shown in broken lines in FIG. 7, to that shown in full lines in FIG. 8, in which the hook 80 is moved into position above the upper edge of the folded-over part 106 of the bag.

The movement of the hook into and out of position to engage the upper edge portion of the folded-over part 106 of the bag is effected in the construction shown by way of example, in the following manner: The hook 80 forms a part of a hook-supporting body 100 which is pivoted at 101 to the support 97 and is also provided with an extension 102 which is positioned to engage a stationary part 104' of the frame of the machine when the hook is in its inoperative position, as shown in FIG. 7. Consequently, when the hook-supporting body is swung into its lowest position, the extension 103 of the hook-supporting body 100 engages the stationary part 104' and thus swings the hook-supporting body 100 in a counterclockwise direction into the position shown in FIG. 7.

The hook 80 when swung into its upper position as in FIG. 8, cooperates with a latch member 107 mounted on a pivot 108 and is urged to swing when in a lowered position in a counterclockwise direction. This latch member also acts as a detent to hold the hook in its inoperative position until in position above the bag to engage the same. For this purpose the latch member has a pin or extension 110 adapted to engage a shoulder on the hook member 100, and hold the same with the hook in its outwardly swung, inoperative position as shown in FIG. 7. The hook member 100 maintains this position while the support 97 is swung upwardly. When the lower part of the latch member contacts with the folded-over part 106 of the bag, it is swung into a position with its extension out of engagement with the shoulder on the hook member, thus causing the hook member to be swung downwardly into engagement with one side of the folded-over part of the bag. The parts are then in the position shown in FIG. 8 in which the upper edge of the folded-over part 106 of the bag is securely gripped by the hook 80.

Figure 15:
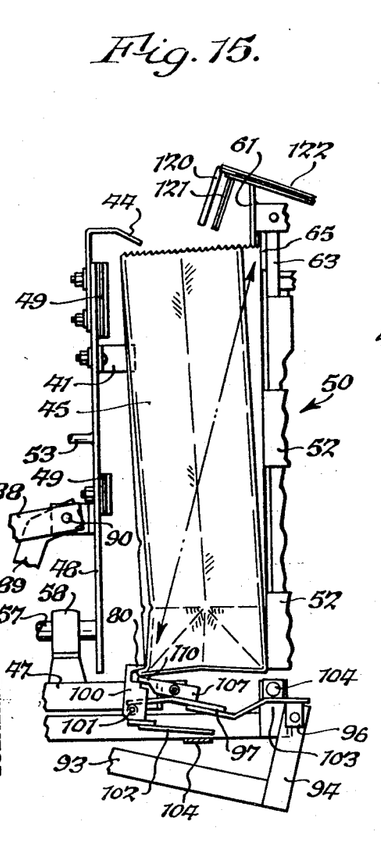
FIG. 15 is an elevation showing the mechanism for further opening the bag after it has been partly opened by grasping the same at the upper edge thereof.
Figures 16, 17:
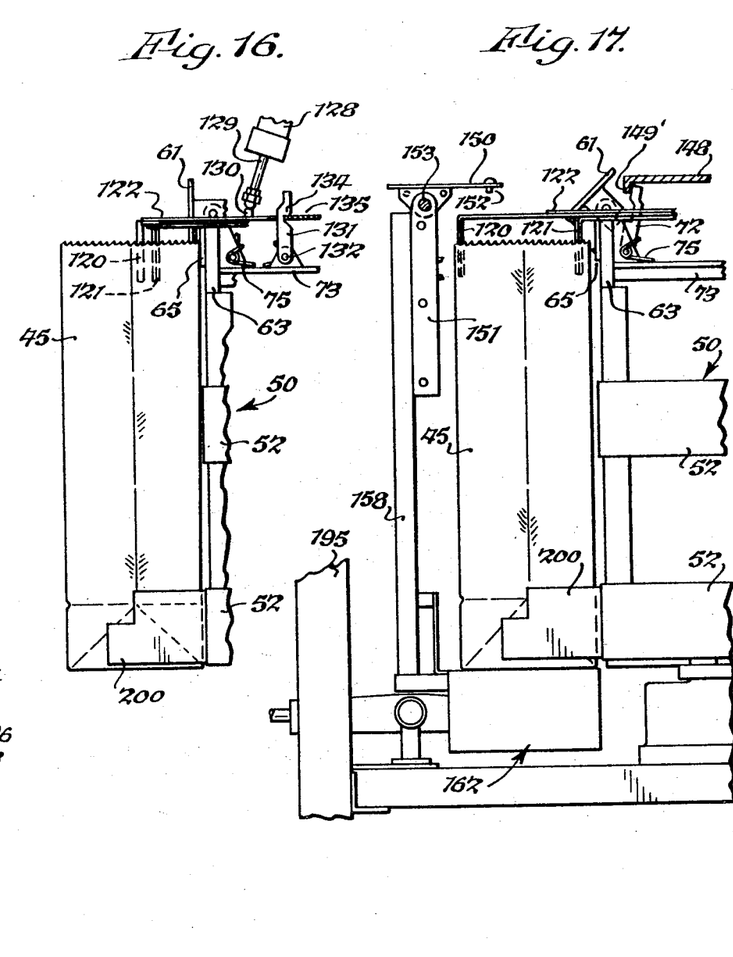
FIG. 16 is a fragmentary elevation showing the fingers for further opening the upper edge of the bag after having passed into the partly open, upper end of the bag.
FIG. 17 is a view similar to FIG. 16 showing the fingers moved into extended positions to hold the upper end of the bag in widely open position.

When the hook has grasped the folded-over base of the bag, the support 97 is again swung backwardly from the position shown in FIG. 8. During this movement the hook and latch members pull the upper, folded edge downwardly, thus partially opening the bag, as shown in FIG. 15. Upon further downward movement the hook extension 102 will engage the frame member 104, as shown in FIG. 15, and this results in the swinging of the hook backwards away from the bag, and also the movement of the latch member in a counterclockwise direction in FIG. 15 to the position shown in FIG. 7, whereupon the bag is released and the latch member 107 is again moved into the position in which its end engages the shouldered portion of the hook member, as shown in FIG. 7, so that the hook is again swung backwardly into position to move into position to engage the upper edge of the part 106 of another bag.

The pulling down of the satchel of a bag results in a partial opening of the upper portion of the bag, this resulting partially by means of the fingers 44, which upon backward movement of the plate 48 pull the back panel of the bag away from the front panel. In order to more completely open the bag I provide two pairs of fingers 120 and 121 having downwardly extending parts which are inserted into the partially opened bag while positioned in close proximity to each other, as shown in FIG. 11, so that they can readily be passed into the relatively small opening of the bag. These fingers have horizontally extending parts which are pivoted on the ends of two diverging arms 122 and 123 formed integral with each other and pivoted at 125 so that the ends of the arms may be swung vertically to move the fingers 120 and 121 into and out of the bags.

The pivot pin 125 is mounted between pedestals 127, FIG. 11, secured on the horizontal plate 73 of the turret and the downward swing of the arms 122 and 123 is effected by means of a motor, such as an air motor 128 having a piston rod 129 which acts on a bar 130 connected to the two arms 122 and 123. When the motor 128 has pushed the arms 122 and 123 downwardly against the action of a spring 127' the fingers enter into the open end of the bag and are releasably held against upward motion by means of a finger latch 131 pivoted at 132 on a horizontal plate 73 of the turret. Springs 126 having one end connected to studs that carry cam rollers 149 on the disks 140 and the other ends to a spring clip 126' mounted to pivot pin 125. This latch is urged by means of a spring 133 into a position in which a notch or shoulder 134 of the latch engages a part 135 connected with the arms 122 and 123 to hold the arms in lowered position. When released by the latch 131 the arms 122 and 123 are swung into their inclined, inoperative positions by the spring 127' against a stop 137.

The spreading of the horizontal parts of the fingers 120 apart to enable the downwardly extending parts to enter two opposite corners of the bag is effected by means of a pair of disks 140 pivoted at 145 on the arms 122 and 123. Links 144 are pivotally connected at 141 to the disks 140 and at their opposite ends are pivotaly connected with the ends of the horizontal parts of the fingers 120 which extend beyond their pivotal connections with the arms 122 and 123 so that movement of the links 144 relatively to the fingers 120, due to their pivotal connections with the disks 140 causes these fingers to move away from each other to fit loosely into opposite corners of the bag.

Figure 10:
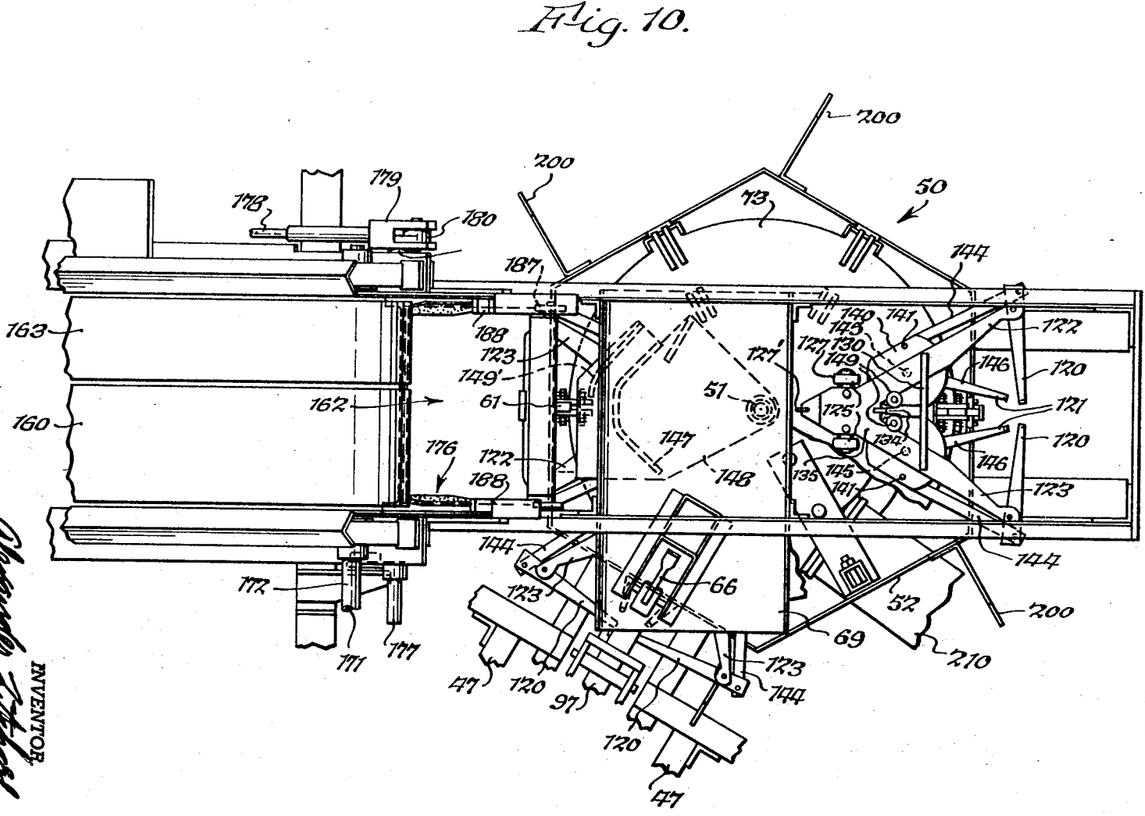
FIG. 10 is a fragmentary, top plan view on an enlarged scale of the turret and parts of the machine cooperating therewith.

The other pair of fingers are secured on the arms 146 rigidly connected to the disks 140 so that when these disks rotate about their axes the fingers 121 are moved away from each other from the position shown in FIG. 10 into the two corners of the bag opposite to those in which the fingers 120 are located so that when these fingers 121 are also moved away from each other, the open, upper end of the bag will then be opened sufficiently to receive produce. The rotation of the disks 140 about their pivots 145 may be effected in any suitable manner, for example, by means of a stationary cam 147 mounted above the disks 140 on a plate 149 mounted on the turret. The disks 140 have rollers 149 pivotally mounted thereon which roll on the cam 147 to cause the disks 140 to swing about their pivots 145 and thus move the arms 142 in a direction to produce the outward swinging of the fingers 120, as described. The turning of the disks 140 also moves the other rigidly connected arms 146 from the positions shown in FIG. 10 to those shown in FIG. 20, in which the fingers 121 are moved close to the opposite corners of the bag. This turning of the disks 140 results from the movement of the turret from one station to the next station shown in FIG. 20, in which the opened bag is presented to the filling mechanism. During this movement of the turret the thumb latch 61 is released by engagement of the holding latch 72 with an overhead cam or the like 149', so that the weight of the bag is fully supported on the platform scale.

Figure 18:
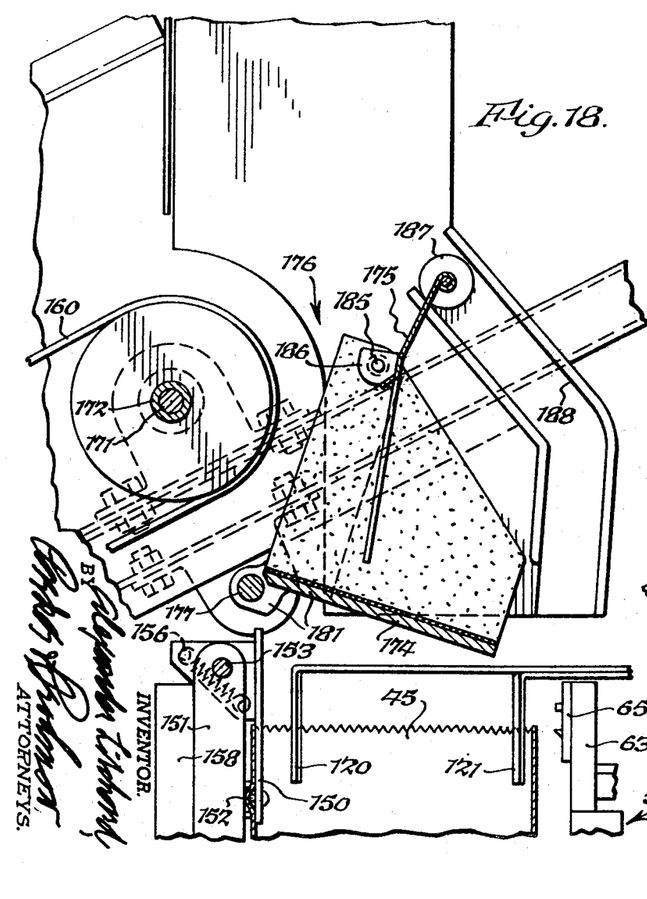
FIG. 18 is a fragmentary elevation on an enlarged scale showing the mechanism for feeding produce into the bag.
Figure 24:
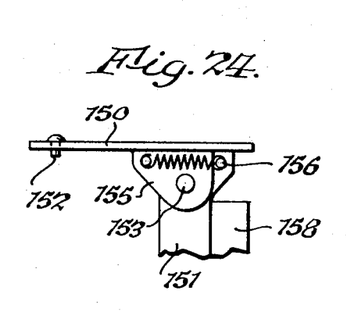
FIG. 24 is a fragmentary, sectional view on the line 24—24, FIG. 23.
Figure 25:
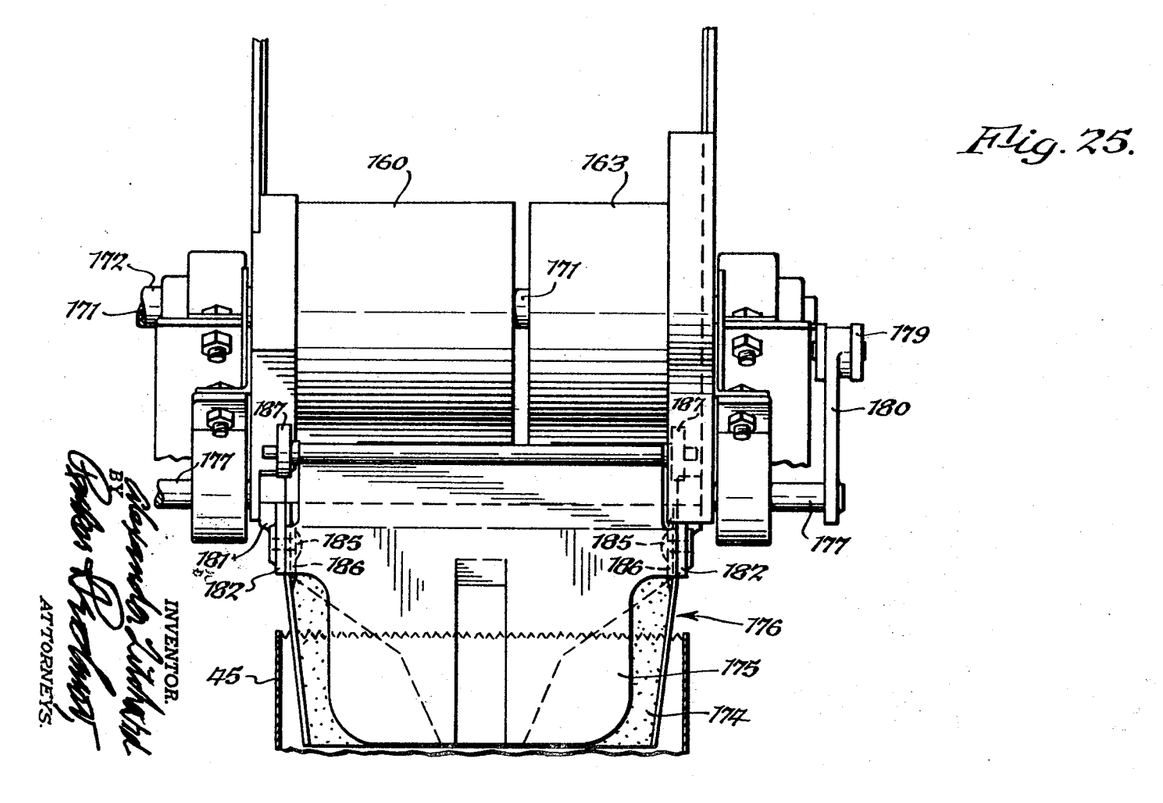
FIG. 25 is a fragmentary elevation showing the parts of the feed mechanism in different positions.

The bag is then clamped by a plate 150 on the side of the bag opposite to that which had been grasped by the thumb latch 61. This plate is mounted on an extension 151 of a pillar 158 extending upwardly from the scale platform so that the weighing of the material in the bag will not be affected by the weight of the plate 150 nor the extension 151 to which the clamping plate is pivoted at 153. This plate 150 is provided with a projection 152 which cooperates with projections on the pillar to grasp the bag so as to hold it securely on the scale. The plate 150 is held in its bag-gripping position as shown in FIG. 18, or in an upper, inoperative position by means of a spring 154 having one end thereof secured to a lug 155 on the plate 150 and at the other end on a stationary projection 156 of extension 151. Consequently, when the spring is below the pivot 153, it will hold the plate 150 in bag-gripping position, and when the plate is raised, the spring will be above the pivot 150 and will hold the plate out of engagement with the bag, as shown in FIG. 24.

Bag-opening mechanism as described is mounted on each of the stations of the turret and when the bag is fully opened, it will be moved into a position to receive the produce which is fed to the bag by means of a pair of belts having their upper arms inclined upwardly toward the discharge ends. One of these belts 160 is mounted to operate until a certain weight below that finally desired is registered on a scale connected with the scale platform 162. Since scales responsive to weights of material placed on the platform are well known, description of the same is not believed necessary. The other belt 163 operates continuously and is narrower than the belt 160 and consequently carries a reduced quantity of the produce or other material.

Figure 1:
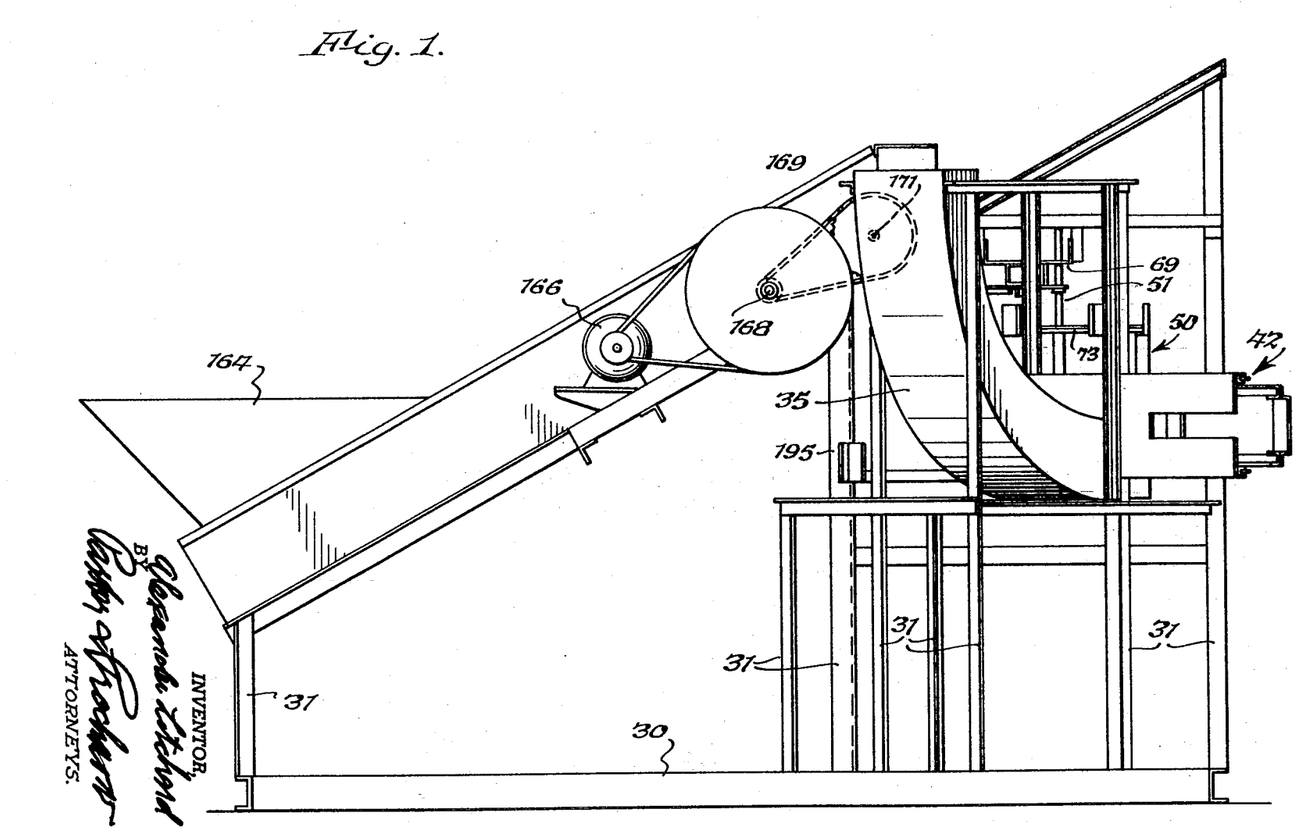
FIG. 1 is a side elevation of a packing machine embodying this invention.
Figures 2, 3:
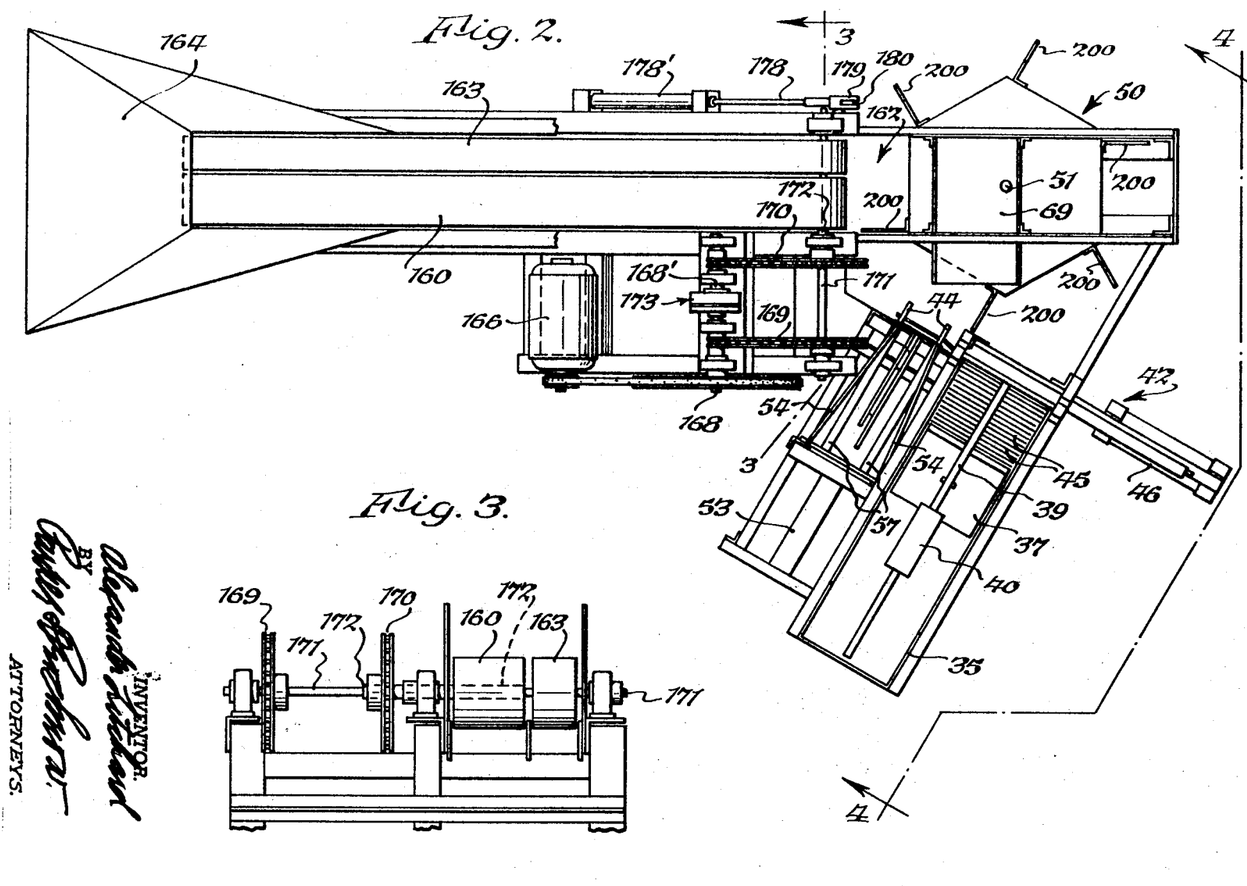
FIG. 2 is a top plan view thereof.
FIG. 3 is a fragmentary, sectional elevation thereof on line 2—2, FIG. 2.

The belts receive material from a hopper 164, FIGS. 1 and 2, and are driven in any suitable manner, for example, by means of a motor 166 having a driving connection with a shaft 168. Shaft 168 has a sprocket which drives a chain 169 engaging a larger sprocket on a shaft 171 connected to a pulley driving the continuously operated belt 163. Shaft 168 also has mounted thereon a sleeve shaft 168' which may be connected or disconnected from the continuously rotating shaft 168 by means of an electric clutch 173. A chain 170 and sprocket drive connects the intermittently driven shaft 168' to a hollow shaft 172 which drives the belt 160.

The clutch 173 is operated by a suitable scale-controlled means to interrupt the drive of shaft 172 when the the weight on the scale is somewhat below the final weight desired, while the smaller shaft 171 continues to rotate. Since scale-controlled means for actuating clutches are well known, they are not herein shown or described. Any other suitable means for driving the two belts may be provided.

The upper or discharge ends of the inclined feed belts terminate above the open bag which rests on the scale platform 162, FIG. 2.

The two feed belts discharge the material into a bag after the same has been clamped in place by means of the clamping plate 150, through a spout device 176 having a rigid base 174 which moves into the bag when produce is discharged into the bag. The spout is preferably made of a flexible material, such as rubber, having its base resting on the rigid mamber 174 and having sides extending upwardly therefrom.

Figure 19:
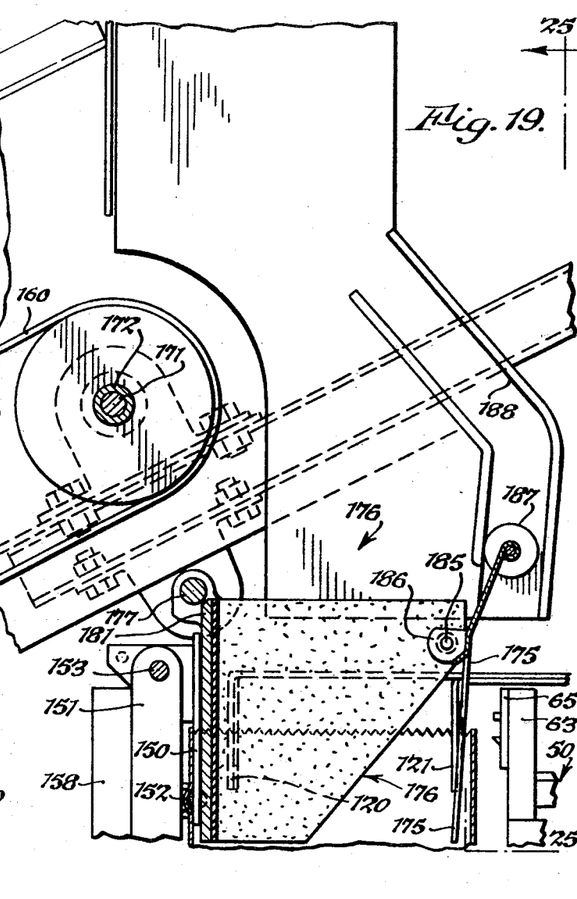
FIG. 19 is a similar view showing the parts of the mechanism in different positions.

The material discharged through the spout is also confined or guided into the bag by means of a plate 175 extending into the bag at the side thereof opposite the base 174 of the spout and the two parts are shown in their lowered position in FIG. 19 in which material from the two belts 160 and 163 drops into the spout. When the desired weight has been reached, the spout and plate are moved into their upper positions shown in FIG. 18, in which the plate 175 interrupts flow of material through the spout. Consequently any produce discharged from the continuously operating belt 163 is collected in the spout and held therein for discharge into the next bag.

Figure 20:
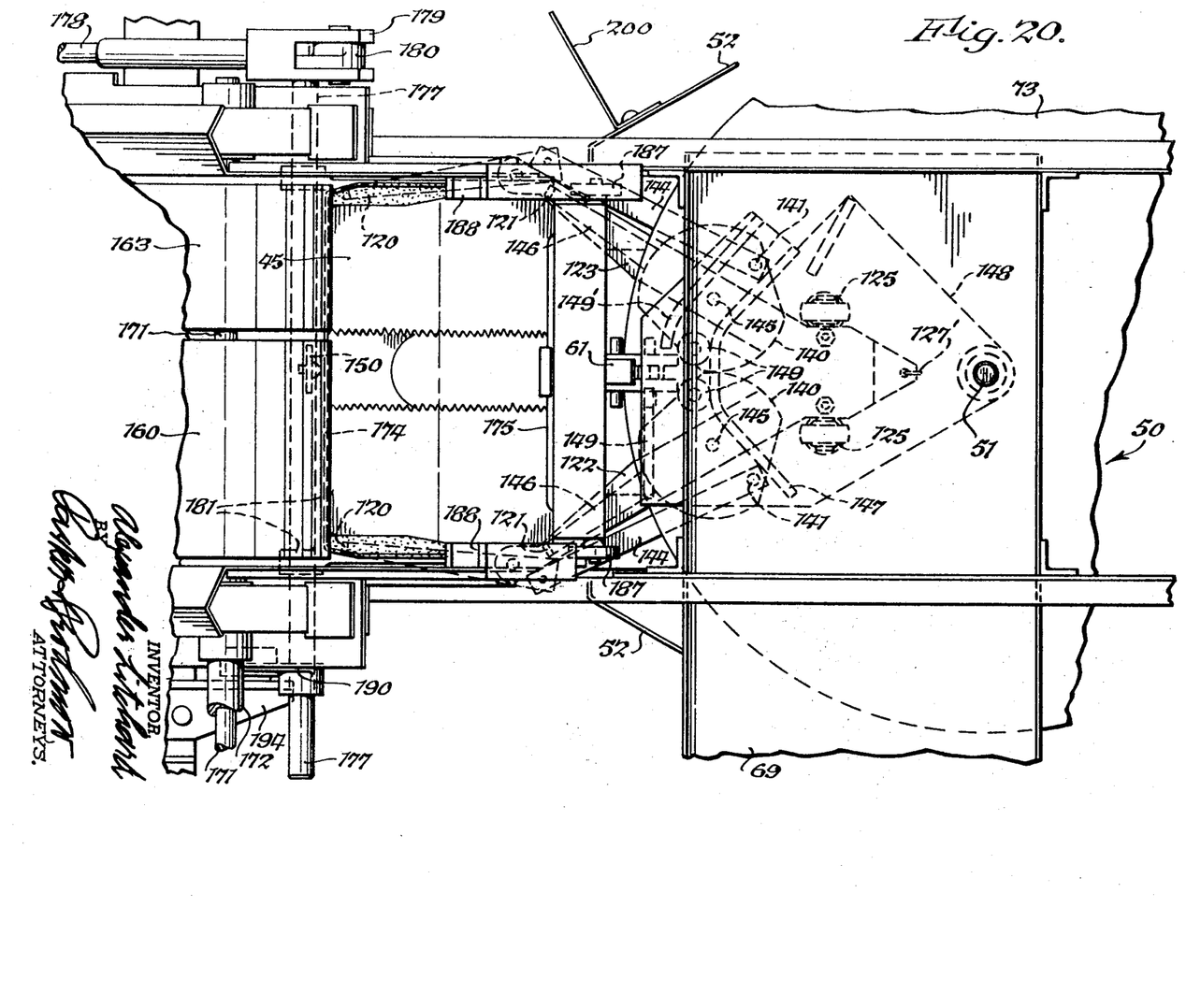
FIG. 20 is a fragmentary plan view of the mechanism shown in FIGS. 18 and 19.

The actuation of the spout and of the clamping member 150 is effected by means of a shaft 177 journalled on the frame of the apparatus, FIG. 20, and oscillated by means of an air motor or the like through its piston rod 178 connected by means of a clevis 179 to an arm 180 secured to the shaft. This shaft has a bracket 181 extending lengthwise of the same and provided with two arms 182, both of which are secured to the shaft 177. The bracket 181 is secured to the base plate 174 of the spout frame so that by turning the shaft 177 the spout frame is turned from the position shown in FIG. 18 to that shown in FIG. 19.

The cutoff plate 175 is actuated by the movement of the spout. For this purpose the spout has pivots 185 with which lugs 186 of the plate 175 are connected. By comparing FIGS. 18 and 19 it will be obvious that when the spout is lowered, the plate 175 is carried with it. The motion of the cutoff plate 175 is controlled by means of rollers 187 pivoted on the upper end of the plate 175 and arranged to move in cams or channels 188 in such a manner that when the rollers 187 are in the upper part of the cam or channel 188, the plate will be in the position shown in FIG. 18 to close the spout and thus form a receptacle for excess produce discharged by the belt 163. When the spout 176 is lowered, the rollers 187 will guide the plate cutoff 175 into a position in proximity to the side of the bag opposite the spout.

Figure 21:
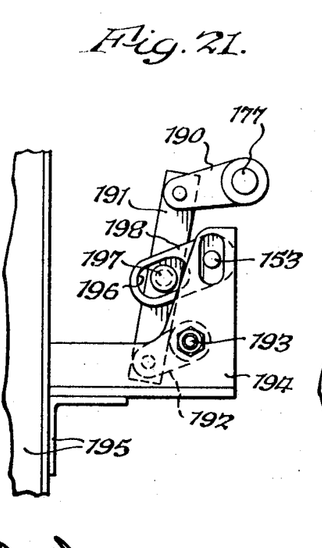
FIG. 21 is a fragmentary elevation of a mechanism for controlling the operation of the feed mechanism and bag-releasing mechanism.
Figure 22:
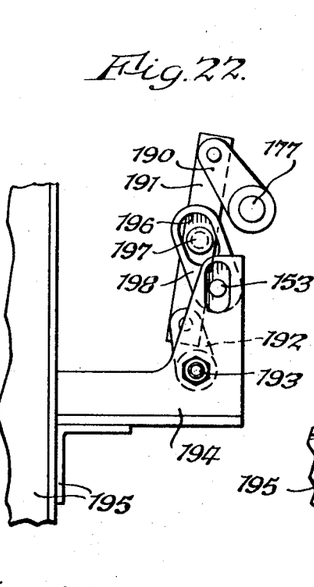
FIG. 22 is a view similar to FIG. 21 and showing the parts in different positions.
Figure 23:
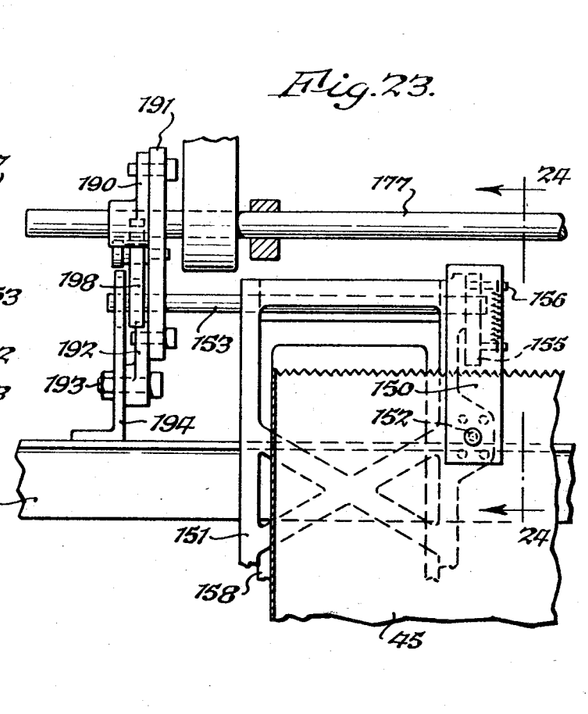
FIG. 23 is an elevation of the parts controlled by means of the constructions shown in FIGS. 21 and 22.

The movement of the clamping plate 150 into and out of its operative positions is also effected by means of the shaft 177 which extends at one end beyond the frame of the apparatus, see FIGS. 21–23. This shaft 177 has an arm 190 extending outwardly therefrom and pivoted at its outer end of a connecting member 191, the lower end of which is pivoted to a link 192 pivoted at 193 on a bracket 194 extending outwardly from a frame member 195. Consequently the swinging of the shaft 177 through an angle of somewhat less than a right angle produces a swinging of the connecting member 199 upwardly and downwardly somewhat like a link of a parallelogram.

The shaft 153 is journalled on the extension 151 of the scale of the apparatus and has an outwardly extending arm 198 rigidly secured thereto and provided with a slot 196 through which extends a pin 197 rigidly secured on the connecting member 191. This slot 196 is enlarged so that the pin 197 can move to a limited extent in this slot. Consequently when the mechanism described moves from the position shown in FIG. 21 to that shown in FIG. 22, the shaft 153 is swung through an angle, due to contact of the pin 197 with one side of the slot 196. The slot connection between the pin 197 and the slot 196 causes the shaft 153 to be swung in one direction through an angle sufficient to move the clamping plate 150 so as to position the spring to one side or the other of the shaft 153, whereupon the spring 154 continues movement of the clamping plate into clamping position, as shown in FIGS. 18 and 19, or upwardly to a position in which the spring 154 is located above the shaft 153, whereupon further movement of the plate 150 into its inoperative position is effected by the spring 154. Any other means for moving the clamping plate 150 into and out of bag-clamping position may be employed.

By means of this construction it will be obvious that the weight of the linkage for moving the clamping plate into and out of clamping position will not affect the weight of material in the bag because the slot 196 permits movement of the parts mounted on the column 158 independently of the mechanism for moving the clamping plate.

After the bag has been filled the clamping plate is moved out of the bags and the part 176 and plate 175 are raised from the bag. The fingers 120 and 121 which have loosely held the bag open so as not to affect the weight of the bag and contents are raised from the bag by release of the stop by the cam 147 on the plate 148 while the bag is advancing. The bag is then free to be removed from the machine. The next advance of the turret moves the bag from the stationary scale, for example, by one of its outwardly extending arms 200, to a discharge position in which any suitable means may be provided for closing the upper end of the bag, whereupon the bag may be removed from the machine in any desired manner.

The operation of the machine will be understood from the foregoing description from which it will be obvious that various sections of the turret are each provided with mechanism for carrying on the various operations of the presentation of the bag to receive the produce, whereupon the bags are deposited on the stationary scale.

Figure 26:
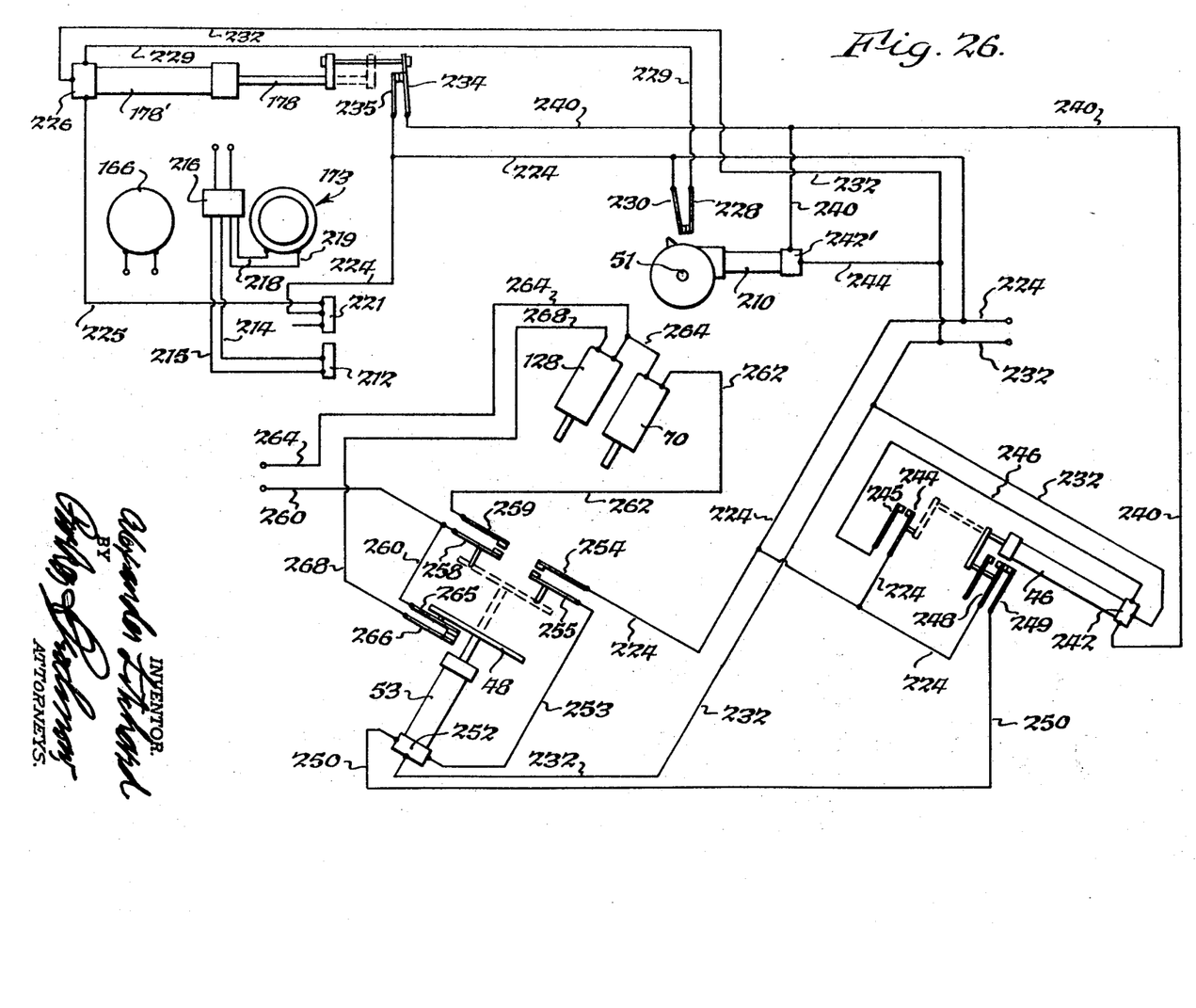
FIG. 26 is a diagram showing the means for actuating the various parts of the machine.

FIG. 26 shows a diagram of simplified electrical connections connecting the various parts of the apparatus, and shows all of the activators used to cause the machine to pass through its various operations as previously mentioned. Some of the activators shown are pneumatically powered and others are purely electrical, but all are motivated and controlled through electrical circuitry.

An indexing motor mechanism 210 is used to index the turret 50, moving it one-sixth of a revolution, or one station at a time. It is constructed to rotate one station upon an electrical impulse and then stop that station until it is reactivated again by the next impulse. It will be obvious that only three stations are used out of all six, i.e., bag-opening, bag-filling and discharge.

We will assume that the various electrical current supplies are turned on and the belt feeder motor 166 is now running. The weighing scale 162 actuates a switch 212 connected through lines 214, 215 to a current supply transformer 216 also connected through lines 218, 219 to the electrical clutch 173. When the bag being filled nearly reaches the proper weight, the scale actuates this switch 212 and causes the clutch 173 to disconnect the large conveyor 160 from its drive connection and come to a stop, leaving just the small, trim belt 163 running and delivering product to the bag. Upon further delivery of a small amount of product the scale 162 actuates the switch 221 and the following then happens. Current from line 224 flows through the switch 221 to line 225 to control 226 of the gate-closing motor 178' to the other side of the line 232, thus energizing controller 226 to cause the gate motor 178 to retract and close the gate or spout 176. Control 226 now being energized causes gate motor 178' to close the gate or spout 176. The bag clamp 150 is released at the same time and a switch 234, 235 is also closed. Current from the line 224 then flows through the closed switch 221, line 238 closed contacts 234, 235, line 240 to controller 242', line 244 to the other side of the line 224. Controller now energized causes the index motor to index the turret one station, bringing the filled, weighed bag of produce to the discharge station.

When index 210 motor driving the turret 50 completes its index it momentarily closes contacts 228 and 230 causing current to flow from line 232, contacts 228, 230, line 229 to controller 226 to advance the gate and spout cylinder 178' to place the gate and spout into a fresh empty bag 45.

While the above has been taking place, current also flows from the line 240 to the controller 242 of the bag feed cylinder 46 and back to the other side of the line 232. Energizing of controller 242 causes the cylinder 46 to feed a bag 45 from the magazine 35 into the bag-opening station. Upon completion of its feeding a bag and at the end of its stroke contacts 244, 245 are closed and the piston of cylinder 46 retracts through energizing of the controller 242 through the line 224, contacts 244, 245, line 246, controller and to the other side of line 232.

The bag feeding cylinder after feeding a bag is now retracted and it closes the contacts 248, 249 and current flows from the line 224 through contacts 248, 249, line 250, controller 252 and back to the other side of the line 232. Controller 252 now energized causes the bag opener cylinder 53 to advance the bag to the turret 50. Upon reaching this point the contacts 254, 255 are closed by plate 48 and current flows from line 224, contacts 254, 255, line 253, controller 252 and back to the other side of the line 232. The controller 252 now being energized, the cylinder 53 retracts to its back position.

While at the advance position the bag-supporting plate 48 also closes the thumb latch motor contacts 258, 259. Current then flows from the line 260, contacts 258, 259, line 262, thumb motor 70 and back to the other side of the line 264. Thumb motor being energized, the thumb latch 61 will clamp the bag to the pad 65.

When retard position of the bag-supporting plate 48 is reached the contacts 266, 265 are closed. Current then flows from line 260, contacts 265, 266, line 268, finger motor 128 and back to the other side of the line 264, thus bringing the fingers 120, 121 down into the bag.

As will now be noted the completion of filling and weighing a bag of produce will set the various mechanisms of the machine into a complete cycle of operation to always present an empty bag to be filled. It must be assumed here that sufficient time is taken to fill a bag with produce for all of the preliminary operations to take place as explained.

It will be understood that various changes in the details, materials and arrangements of parts which have been herein described and illustrated in order to explain the nature of the invention may be made by those skilled in the art within the principle and scope of the invention as expressed in the appended claims.

I claim:
1. An automatic packaging machine for packaging articles in bags having front and rear panels connected by sides and having their bottoms folded upwardly when empty,
(a) a magazine in which the bags are advanced in the machine while resting on their bottoms,
(b) a feed device for moving the bags edgewise while in upright position one at a time from the discharge end of the magazine,
(c) a turret rotatable about an axis and having a plurality of sections,
(d) means for feeding the bags after discharge from the magazine in a direction transverse of their panels into sections of said turret,
(e) a latch on said turret for gripping the upper edge portion of one of said panels of a bag,
(f) means for pulling the upwardly folded bottom portion of a bag downwardly to partially open the upper end of the bag,
(g) fingers mounted on said turret and movable from a position in proximity to each other to outer positions into the corners of the bag,
(h) means for inserting the fingers while in close proximity to each other into the partially open end of a bag,
(i) a scale on which the opened bag is positioned by the turret,
(k) a gripping plate extending into said bag and mounted on said scale and swingable to grip the other panel of the bag,
(l) means for releasing said latch when the bag is engaged by said plate,
(m) a spout movable from an upper position downwardly into the open upper end of the bag to guide material into the bag,
(n) a cutoff plate mounted to enter said bag with said spout to form therewith a four-sided chute extending into said bag,
(o) a pair of belts delivering produce above the upper end of the bag into said spout,
(p) one of said belts being larger than the other and being stopped when the scale indicates a weight slightly less than that desired and the smaller belt operating continuously to bring the contents of the bag to that desired,
(q) means for raising said spout out of the bag when the bag has attained the desired weight, and
(r) means for moving said cutoff plate into said spout to form with said spout a receptacle for receiving excess produce delivered by said smaller belt.

2. An automatic packaging machine for packaging articles in bags having front and rear panels connected by sides and having their bottoms folded upwardly when empty,
(a) a magazine in which the bags are advanced in the machine while resting on their bottoms,
(b) a feed device for moving the bags edgewise while in upright position one at a time from the discharge end of the magazine,
(c) a turret rotatable about an axis and having a plurality of sections,
(d) means for feeding the bags after discharge from the magazine in a direction transverse of their panels into sections of said turret,
(e) means for opening the upper end of the bag to receive articles,
(f) a scale on said turret on which the open bag is positioned,
(g) a spout movable downwardly into the open upper portion of the bag to guide articles into the bag,
(h) a pair of belts delivering produce into the open upper end of the bag,
(i) one of said belts being larger than the other and being stopped by said scale when the bag contains slightly less than desired, and the smaller belt operating continuously to bring the contents of the bag to that desired,
(j) and means actuated by said scale for raising said spout out of the bag into position to form a receptacle for excess material discharged by the smaller of said belts.

3. An automatic packaging machine for packaging articles in bags,
(a) a turret rotatable about a pivot and having a plurality of sections,
(b) bag-opening mechanism in each of said sections,
(c) a scale mounted at one of the stations of said turret,
(d) means for releasing the bag from the turret and positioning the same on said scale,
(e) means for feeding articles to said bag while on said scale,
(f) and parts on said turret for moving the filled bags from said scale.

4. A packaging machine according to claim 3 and including clamping means on said scale for supporting said bags on said scale while being filled.

5. A packaging machine according to claim 3 and including a latch in each section of said turret for holding the bag,
   (a) a mechanism movable into the bag for opening said bag,
   (b) a scale,
   (c) a bag-clamping member mounted on said scale and engaging said bag,
   (d) means for releasing said latch when said bag is engaged by said clamping member on said scale,
   (e) means for supplying articles to said bag while positioned on said scale,
   (f) mechanism for removing said clamping member and the mechanism for holding the bag open from said bag when the supply of articles to said bag is stopped,
   (g) and arms on said turret which push the filled bag from the machine.

6. An automatic packaging machine for packaging articles in bags,
   (a) a turret rotatable about a pivot and having a plurality of sections,
   (b) means for feeding the bags one at a time to the sections of said turret,
   (c) bag-opening mechanism mounted in each section of said turret for opening the upper part of each bag,
   (d) a scale at one of the stations of said turret,
   (e) means for releasing the bag from the turret to said scale while the bag is held open by the turret,
   (f) discharge means for depositing articles in the bags while on said scale,
   (g) and a part on said turret for moving the filled bags from said scale.

7. An automatic packaging machine for packaging articles in bags having front and rear panels connected by flexible sides and having their bottoms folded upwardly when empty,
   (a) a magazine in which the bags are advanced in the machine while resting on their bottoms,
   (b) a feed device engaging the bags one at a time at the discharge end of the magazine to move them edgewise from the discharge end of the magazine,
   (c) a turret rotatable about an axis and having a plurality of sections,
   (d) a feed plate movable back and forth and feeding said bags after discharge from the magazine, in a direction of approximately right angles of the movement imparted to the bags from the first mentioned magazine,
   (e) means in each of said sections of said turret for opening the upper ends of the bags to receive articles.
   (f) a scale at one of the stations of said turret on which the open bags are positioned by the turret,
   (g) and means for feeding articles to the bags while on said scale.

8. An automatic packaging machine for packing articles in bags having front and rear panels connected by flexible sides and having their bottoms folded upwardly when empty,
   (a) a turret on said machine revolving about a pivot and having sections into which the bags are fed,
   (b) a plate movable toward and from said turret to feed bags thereto,
   (c) each section having a latch movable into a clamping position in engagement with one of the panels of a bag,
   (d) a hook member movable into engagement with the folded-up bottom of the bag,
   (e) means for moving said hook member downwardly in a substantially circular direction to pull the bottom of the bag downwardly and outwardly away from that panel of the bag which is held by the latch, for moving the other panel of the bag away from the panel which is gripped by said latch, for opening the upper end of the bag.

9. A packaging machine according to claim 8 and including a finger positioned at the upper edge of the bag and movable outwardly from said latch and urging the panel of the bag opposite to that held by the latch into open position.

10. A packaging machine according to claim 8 for operating on bags having a thumb opening in the upper edge of one of said panels and through which said latch passes to engage with the other panel of the bag,
   (a) and a finger movable into engagement with the upper edge of the other panel of the bag and attached to said feed plate and drawing said other panel from said latch on return movement of said feed plate to open the bag.

11. An automatic packaging machine for packaging articles in bags having front and rear panels connected by flexible sides and having their bottoms folded upwardly when empty,
   (a) a magazine in which the bags are advanced in the machine while resting on their bottoms,
   (b a feed device engaging the bags to advance them edgewise from the discharge end of the magazine,
   (c) a turret rotatable about an axis and having a plurality of sections,
   (d) a feed plate movable toward and from said turret,
   (e) said bags when advanced from the magazine being positioned between said feed plate and said turret,
   (f) said feed plate having a finger which extends over the upper edge of the bag when positioned between said plate and said turret,
   (g) a latch in each section of the magazine positioned to grip one panel of each bag,
   (h) said finger, when said feed plate is moved away from said turret, drawing the rear panel of the bag from the front panel engaged by said latch, to open the bag.

12. An automatic packaging machine for packaging articles in bags having front and rear panels connected by flexible sides and having their bottoms folded upwardly when empty,
   (a) a magazine in which the bags are advanced in the machine while resting on their bottoms,
   (b) a turret rotatable about an axis and having a plurality of sections,
   (c) feed means for advancing said bags one at a time from said magazine to a section of said turret,
   (d) means cooperating with said panels for opening the upper ends of the bags,
   (e) mechanism for inserting a number of fingers situated closely to each other into each bag after it has been partially opened,
   (f) means for spreading said fingers outwardly while in the bag to more completely open the same,
   (g) a scale, means for transferring the bags when more completely opened to said scale,
   (h) means for filling material into the bags when more completely opened,
   (i) and means controlled by said scale for interrupting the filling of said bags.

13. An automatic packaging machine for packaging articles in bags having front and rear panels connected by flexible sides and having their bottoms folded upwardly when empty,
   (a) a turret on said machine revolving about a pivot and having sections into which the bags are fed,
   (b) a plate movable toward and from said turret to feed bags thereto,
   (c) each section having a latch movable into a clamping position in engagement with one of the panels of a bag,
   (d) a hook member movable into engagement with the folded-up bottom of the bag, (e) a linkage connecting said plate and said hook member for moving said hook member upwardly above the upper edge of the folded bottom of the bag when the plate is moved toward the turret, (f) detent means for holding said hook member in an upper position above the upper edges of said folded-over bottoms of the bags, (g) means for releasing said detent means when the hook member is above said bottom of the bag to permit the hook member to engage the same, (h) said linkage connecting said plate and said hook member and swing said hook member downwardly to draw the upper edge of said folded-over bottom in a direction away from said bag, (i) said detent means being actuated when said hook is at its lowest position to release the bottom of the bag, (j) whereby a partial opening of the upper end of the bag is effected.

14. A packaging machine according to claim 13 and including a plurality of fingers movable close to each other and away from each other, (a) means for moving said fingers when close to each other into a partly opened bag, (b) mechanism connecting said fingers for moving the same away from each other into proximity to the corners of the bag to more completely open the same, (c) a scale to which said turret advances the bag when more completely opened, (d) and means for discharging material into said bags while on said scale and while held open by said fingers.

15. A packaging machine according to claim 14 and including means mounted on said scale for clamping the bag thereto while being filled.

16. An automatic packaging machine for packaging articles in bags including a turret on which the bags are positioned one at a time, (a) means on said turret for opening the upper ends of said bags to receive material, (b) a scale adjacent to said turret and on which the bags when opened are positioned, (c) bag-clamping means mounted on said scale for holding said bags in position on said scale when being filled, (d) a spout for delivering articles to said bag, (e) mechanism actuated by said scale to move said spout into an inoperative position when the bag has attained the desired weight, (f) mechanism connected with said clamping plate and said spout for actuating both spout and plate, said mechanism also moving said plate to clamp the bag on said scale when being filled and release the bag when filled, (g) and means on said turret for moving the filled bags from the scale.

17. A packaging machine according to claim 16 and including a larger belt and a smaller belt feeding the articles to said spout, (a) mechanism between said scale and said larger belt to interrupt the motion of said larger belt when the bag is nearly filled, (b) said smaller belt operating continuously, (c) said spout when moved into its inoperative position receiving excess articles from said smaller belt for delivery to the next bag to be filled.

18. A packaging machine according to claim 17 and including a plate mounted opposite said spout and connected therewith to move into a bag with said spout and opposite thereto, and (a) cam means for moving said plate into position to form with said spout a receptacle for excess articles delivered by the smaller of said belts.

References Cited

UNITED STATES PATENTS

| | | | |
|---|---|---|---|
| 1,909,319 | 5/1933 | Taylor | 53—187 X |
| 2,486,069 | 10/1949 | Smith et al. | 53—188 X |
| 2,722,358 | 11/1955 | Wilson | 53—188 X |

TRAVIS S. McGEHEE, *Primary Examiner.*